United States Patent [19]

Grattier

[11] Patent Number: 5,180,545
[45] Date of Patent: Jan. 19, 1993

[54] LOWER END NOZZLE OF A FUEL ASSEMBLY HAVING A PARTICLE RETENTION DEVICE AND FUEL ASSEMBLY HAVING SUCH AN END NOZZLE

[75] Inventor: Bernard Grattier, Dardilly, France

[73] Assignees: Framatome, Courbevoie; Cogema, Velizy Villacoublay, both of France

[21] Appl. No.: 508,583

[22] Filed: Apr. 12, 1990

[30] Foreign Application Priority Data

Apr. 12, 1989 [FR] France ................ 89 04840

[51] Int. Cl.⁵ .......................... G21C 1/04
[52] U.S. Cl. ...................... 376/352; 376/313; 376/443
[58] Field of Search ............ 376/352, 313, 439, 443, 376/446

[56] References Cited

U.S. PATENT DOCUMENTS

| | | | |
|---|---|---|---|
| 4,427,624 | 1/1984 | Marlatt | 376/352 |
| 4,664,880 | 5/1987 | Bryan | 376/352 |
| 4,678,627 | 7/1987 | Rylatt | 376/313 |
| 4,684,495 | 8/1987 | Wilson | 376/352 |
| 4,684,496 | 8/1987 | Wilson et al. | 376/352 |
| 4,900,507 | 2/1990 | Shallenberger | 376/352 |

FOREIGN PATENT DOCUMENTS

| | | |
|---|---|---|
| 0196611 | 8/1986 | European Pat. Off. . |
| 0289829 | 9/1988 | European Pat. Off. . |
| 2500947 | 3/1982 | France . |

*Primary Examiner*—Donald P. Walsh
*Assistant Examiner*—Neena Chelliah
*Attorney, Agent, or Firm*—Pollock, Vande Sande & Priddy

[57] ABSTRACT

The lower end nozzle (1) comprises an adaptor plate (2), supporting feet (3) and a particle retention device (6) consisting of a filter plate pierced with holes and attached to the bottom face of the adaptor plate (2) over a substantial portion of its surface.

19 Claims, 5 Drawing Sheets

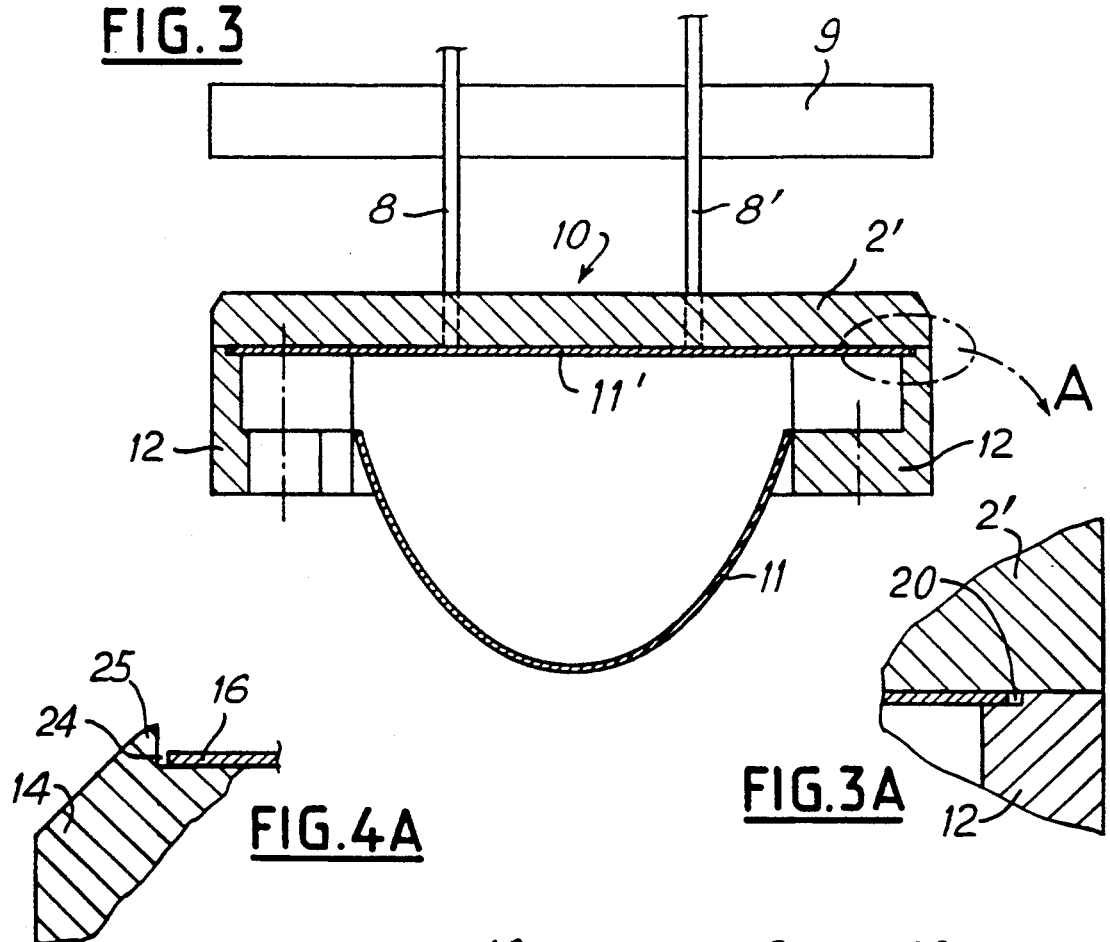
FIG. 3
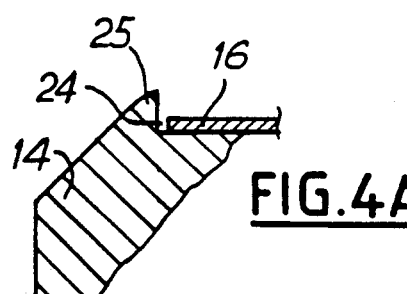
FIG. 4A
FIG. 3A
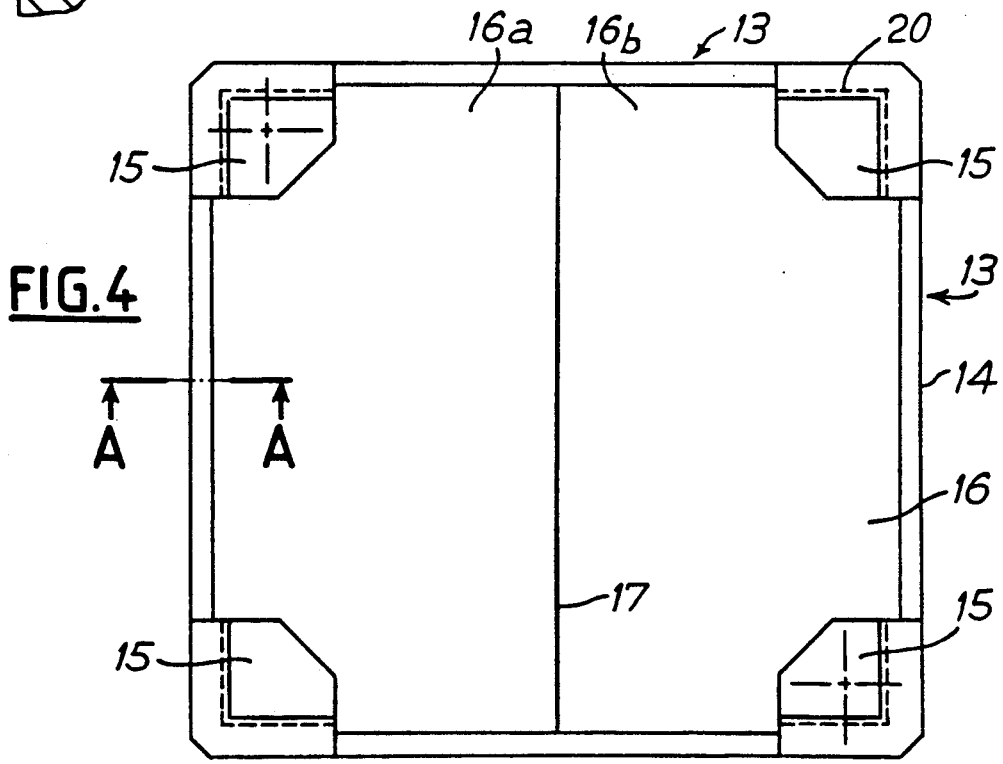
FIG. 4

LOWER END NOZZLE OF A FUEL ASSEMBLY HAVING A PARTICLE RETENTION DEVICE AND FUEL ASSEMBLY HAVING SUCH AN END NOZZLE

FIELD OF THE INVENTION

The invention relates to a lower end nozzle of a fuel assembly having a device for the retention of particles contained in the coolant fluid of nuclear reactors, especially pressurized-water nuclear reactors, and a fuel assembly having such an end nozzle.

BACKGROUND OF THE INVENTION

Pressurized-water nuclear reactors comprise a core consisting of prism-shaped assemblies arranged side by side in vertical position. The assemblies comprise a framework which is closed by means of end nozzles and in which are arranged the fuel rods held by spacer grids spaced apart from one another in the longitudinal direction of the assembly.

The spacer grids constitute a regular network, some locations of which are occupied by guide tubes intended for receiving the absorbent rods of control clusters ensuring the control of the power released by the core of the nuclear reactor. At least some of the guide tubes are attached to the two end nozzles of the assembly by means of their end parts and ensure the junction between the components of the framework and the rigidity of this framework.

One of the end nozzles of the assemblies, called the lower end nozzle, comes to rest on the lower core plate which is pierced with holes in the region of each of the assemblies, to allow the coolant water of the reactor to pass through the core in the vertical direction from the bottom upwards.

The coolant flow for the fuel rods passes through the adaptor plate of the lower end nozzle via apertures called water passages, which are either circular (of a diameter approximately 7 to 10 mm) or of oblong (apertures approximately 10 mm wide by 15 to 50 mm long). Debris which may be present in the primary circuit of the reactor is liable to be carried along by the circulating pressurized water, and if it is of small size (for example, less than 10 mm), this debris can pass through the adaptor plate of the lower end nozzle, the water passages of which have a large cross-section. This debris can become jammed between the fuel rods and the cells of the first grid, i.e., of the lowermost spacer grid holding the rods in a regular array. This debris, subjected to the axial and transverse hydraulic stresses which are high in this zone, can produce wear on the jacket of the fuel rod resulting in a loss of sealing of this jacket and an increase in the rate of activity of the primary circuit of the reactor.

Devices for filtering the coolant flow of the reactor, either during hot-running tests or during the operation of the reactor, are known in the art.

In the case of hot-running tests, the filter elements can be attached to the lower core plate and arranged thereon in the position of the fuel assemblies, before fuelling of the core, as described, for example, in FR-A-2,577,345.

In filtering during reactor operation, the filter elements are associated with the fuel assemblies and are generally arranged in their lower end nozzle. The filter elements fastened in the lower end nozzles of the fuel assemblies usually consist of sheet-metal or metal-wire structures making it possible to stop debris of a size smaller than the largest dimension of the cross-section of the passage between a fuel rod and a grid cell.

Such filter elements are described, for example, in U.S. Pat. No. 4,664,880, U.S. Pat. No. 4,684,496 and EP-A-0,196,611.

Such devices can be complex and introduce a relatively high head loss into the circulation of the coolant flow through the fuel assembly.

Furthermore, these devices placed in the lower end nozzle of the assembly can be bulky and obstructive during loading and unloading of the core assemblies and during the dismounting and refitting of the guide tubes and lower end nozzle.

Some fuel assemblies of recent design comprise a set of guide tubes (for example 16 out of 24) which are attached both to the upper end nozzle and to the lower end nozzle of the assembly, the rigidity of which they ensure, and a set of guide tubes which are attached to the upper connector only, of the assembly. The guide tubes of the second set which are freely engaged in the adaptor plate of the lower end nozzle perform only a guide function, and the lower end nozzle has, in the extension of these tubes, apertures which remain free.

SUMMARY OF THE INVENTION

The filter devices known from the prior art are unsuitable for this type of assembly.

The object of the invention is, therefore, to provide a lower end nozzle of a nuclear fuel assembly, comprising an adaptor plate, supporting feet intended to come to rest on the lower core plate of the reactor, and a device for the retention of particles contained in the coolant flow of the reactor, consisting of a flat element performing the function of a filter grating, filtration of the fluid being carried out in the region of the end nozzle by means of the flat element, without introducing an excessive head loss into the circulation of the coolant flow, without increasing the bulk of the fuel assembly in the region of its lower end nozzle, and while at the same time preserving the possibility of dismounting this end nozzle easily.

To this end the retention device consists of a filter plate pierced with holes and fastened against the bottom face of the adaptor plate.

The invention likewise relates to a fuel assembly having a lower filtering end nozzle comprising a retention device, as defined above.

Another object of the invention is to provide a fuel assembly with a filtering end nozzle, comprising a first set of guide tubes connected to the adaptor plate of its lower end nozzle and ensuring the rigidity of the framework of the assembly and a second set of guide tubes, not connected to the lower end nozzle and freely engaged in the adaptor plate of the lower end nozzle. According to the invention, the assembly has a debris retention device consisting of a filter plate pierced with holes and fastened against the lower face of the adaptor plate by fastening means engaged in apertures of the filter plate which are located opposite apertures passing through the adaptor plate in line with the guide tubes of the second set.

BRIEF DESCRIPTION OF THE DRAWINGS

Several embodiments of a fuel assembly lower end nozzle according to the invention and of a fuel assembly having such an end nozzle will now be described by way of example, with reference to the accompanying drawings.

FIG. 3 is a vertical section view of the lower part of a fuel assembly, showing the mounting of a filter plate in an end nozzle according to the invention, in a first embodiment.

FIG. 3A is an enlarged view of detail A of FIG. 3.

FIG. 4 is a bottom plan view showing the mounting of a filter plate according to the invention, in a second embodiment.

FIG. 4A is a sectional view along line A—A of FIG. 4, showing the profile for holding the filter plate within the end nozzle frame.

DETAILED DESCRIPTION

Figure 1:
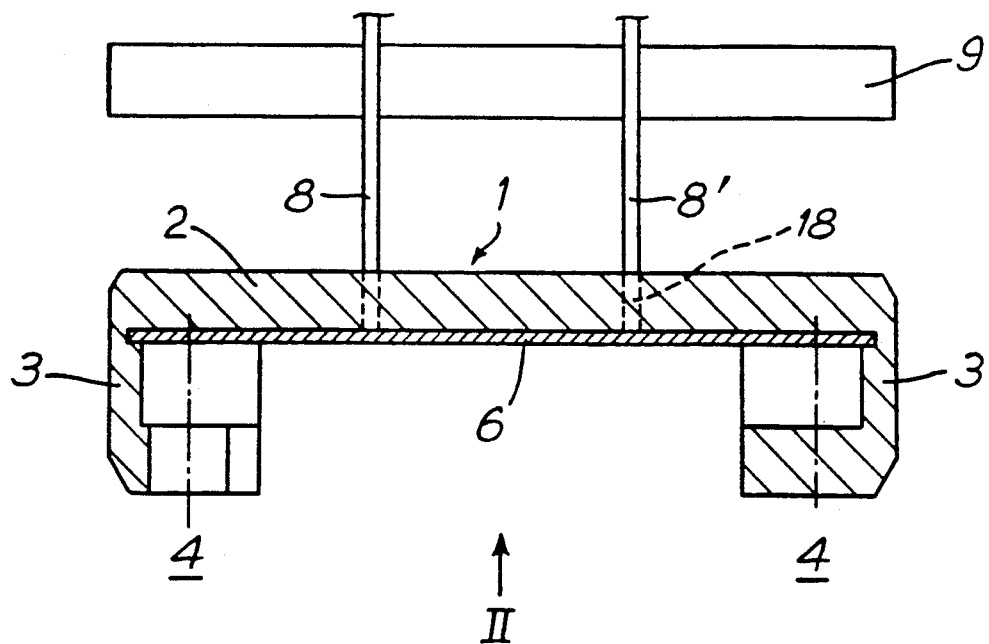
FIG. 1 is a schematic sectional view of the lower part of a fuel assembly according to the invention.

FIG. 1 shows the lower part of a nuclear fuel assembly with a lower end nozzle 1.

This end nozzle comprises an adaptor plate 2, through which water-passage holes pass, and supporting feet 3, which come to rest on the lower core plate 4 of the reactor when the fuel assembly is in operation.

Figure 2:
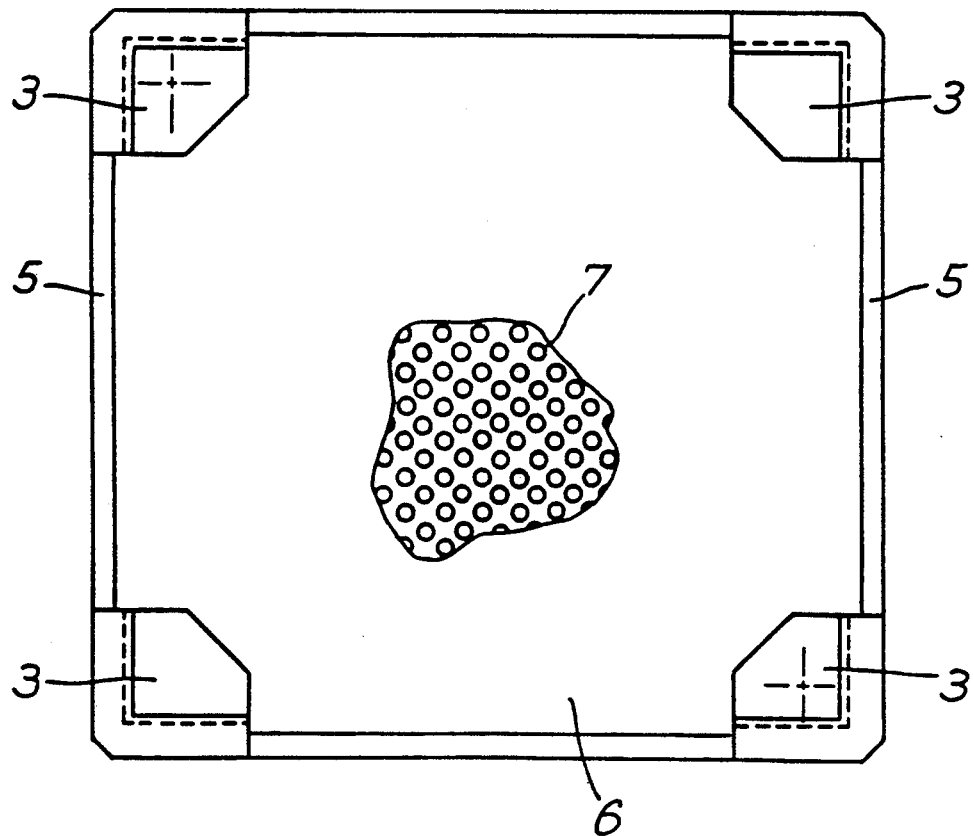
FIG. 2 is a bottom view in the direction of arrow II of FIG. 1.

As can be seen in FIG. 2, the lower end nozzle 1 is closed by means of a frame 5 joining the feet 3.

The fuel assembly has guide tubes, such as the guide tube 8, having a lower part attached to the adaptor plate 2 of the end nozzle 1 and an upper part attached to the upper end nozzle of the assembly (not shown). The framework of the assembly comprises, in addition to the end nozzles and guide tubes 8, spacer grids, such as 9, which are intended to ensure that the rods of the assembly are held secure transversely and axially and in which the guide tubes 8 are engaged and attached.

The assembly can also have guide tubes, such as 8', which are attached only in the upper end nozzle and in the spacer grids 9 and which are not connected to the lower end nozzle.

In contrast to the guide tubes 8 ensuring both the guidance of the absorbent rods of the control clusters and the mechanical stability of the framework of the assembly, the guide tubes 8' serve only for guiding absorbent rods of the control cluster.

An aperture 18 passes through the adaptor plate 2' in line with each of the tubes 8', the lower end of which is freely engaged in the upper part of the plate 2'.

According to the invention, a filter plate 6 pierced with holes is fastened against the adaptor plate 2 of the lower end nozzle 1, substantially over its entire surface.

FIG. 2 shows the holes passing through the filter plate 6 in a zone 7, but in actual fact these holes pass through the plate over virtually its entire surface.

To avoid having to dismount the filter plate 6, it is necessary to ensure that the zones of connection of the guide tubes 8 to the lower end nozzle remain accessible.

Moreover, installed in the central part of the adaptor plate of the lower end nozzle in some types of fuel assembly is a device making it possible to protect the instrumentation glove finger from the hydraulic stresses.

Apertures can therefore be provided in the filter plate in all the zones where this proves necessary. There is, for example, a circular zone of a diameter of approximately 20 mm in the center of the plate, in respect of an assembly having a device for protecting the instrumentation glove finger.

If apertures of a particular dimension are made in the filter plate laid against the adaptor plate, it is necessary to modify the arrangement and dimension of the water passages in the corresponding zone of the adaptor plate. The conventional water passages can be replaced by holes of smaller diameter, ensuring the retention of the debris, instead of the filter plate, according to a known technique.

At all events, the holes passing through the filter plate have dimensions assiduously determined according to the maximum size of the debris which can be allowed to pass through the fuel assembly together with the coolant flow.

The active part of the filter plate having the water-passage holes occupies virtually the entire surface of the filter plate, with the exception of the zones of connection between the guide tubes and the end nozzle and the central zone of the assemblies which has a system for protecting the instrumentation glove finger.

The connection between the filter plate and the adaptor plate can be made permanently or removably.

Thus, it is possible to make this connection by welding (spot welding or bead welding), soldering or riveting. If appropriate, a removable connection can be used between the guide tube and the lower end nozzle in order to ensure the fastening of the filter plate.

When the coolant flow comes under the lower end nozzle of the fuel assembly as it passes through the lower core plate 4 in the region of through-passages, particles of a dimension above a particular limit are retained by the filter plate under the lower end nozzle of the assembly. This debris is therefore not liable to be introduced into the assembly and to be jammed between the fuel rods and the cells of the lowermost spacer grid.

The apertures passing through the filter plate can be of any form and be made by drilling or cutting processes of various types.

The zones of the plate separating the cutouts can be narrow, since the filter plate is adhesively bonded to the adaptor plate of the end nozzle and therefore does not undergo any appreciable mechanical stress under the effect of the passage of the coolant flow at high speed through the lower end nozzle of the assembly.

The passage apertures through the filter plate can likewise be made by stamping, but in this case the stamped parts must coincide perfectly with the water passages of the adaptor plate, since they have parts pushed back outside the plane of the filter plate and forming deflectors for the circulating cooling water.

FIG. 3 illustrates a lower end nozzle 10 of a fuel assembly, into which a filter plate 11 is introduced, utilizing the elasticity of this plate to introduce it between the feet 12 of the assembly. The plate is first bent so as to pass between the inner ends of the feet 12, is then introduced into the lower part of the end nozzle 10 and is finally restored to a plane arrangement 11' underneath the adaptor plate 2'. The filter plate 11 can be fastened by any means, such as welding, soldering, riveting or snapping or even by elastic wedging between the feet 12, in contact with the bottom face of the adaptor plate of the end nozzle 10.

FIG. 3A (or FIG. 4) shows the method for holding the plate 11 (or 16), in each of the corners of an end nozzle, in recesses 20 made in the feet 12 (or 15) of the end nozzle. The plate 11 (or 16) has cutouts which are introduced into the grooves 20. Such cutouts are similar to the cutouts 21 of the filter plate shown in FIG. 6.

FIG. 4 shows a lower end nozzle 13 of a fuel assembly, having a frame 14 surrounding an adaptor plate and supporting feet 15 in each of the corners of the frame 14.

A filter plate 16 in two parts 16a, 16b connected along a median line 17 of the adaptor plate is introduced into the end nozzle and fastened against the adaptor plate, for example by welding, soldering or snapping.

FIG. 4A shows a detail of the positioning of the two-part filter plate 16 shown in FIG. 4. The edge of the plate 16 is introduced into a groove 24 delimited by a shoulder 25 which protects the plate against being torn out during the handling of the assemblies.

Figure 5:
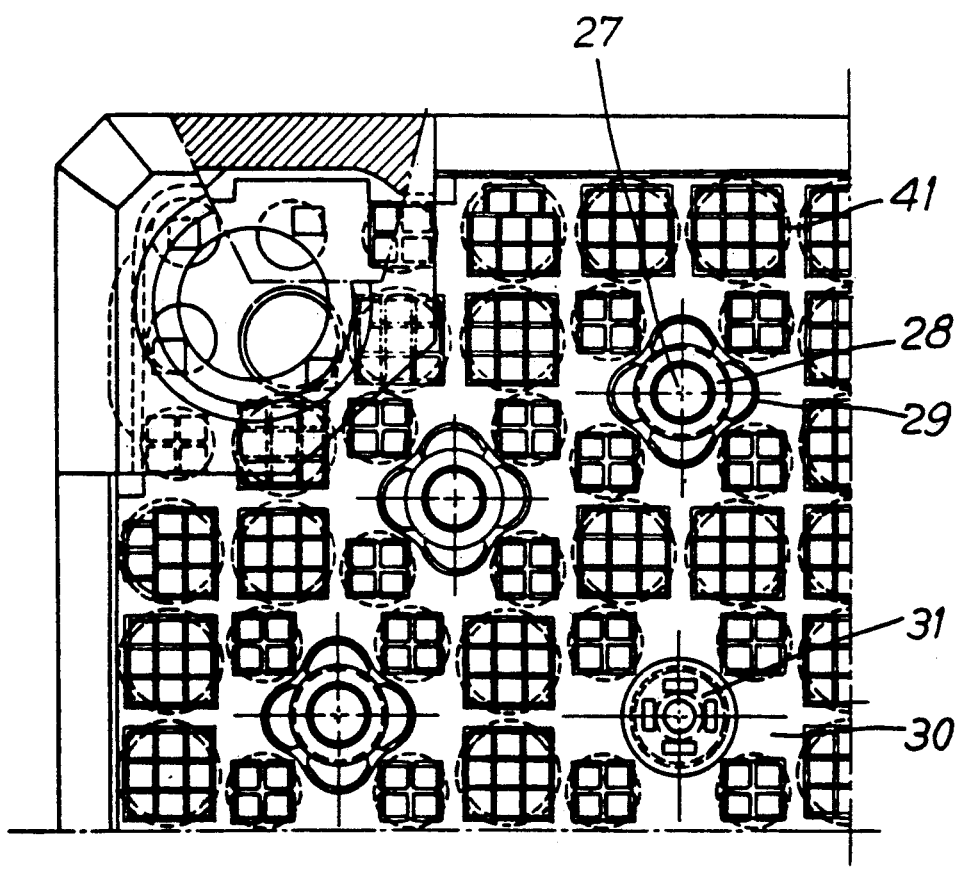
FIG. 5 is a partial bottom plan view showing an adaptor plate of a lower end nozzle of an assembly having two different sets of guide tubes, equipped with a filter plate.

FIG. 5 is a bottom view of a part, adjacent to a corner, of the lower end nozzle of a fuel assembly having guide tubes, only part of which forms the framework of the assembly. The reference 27 denotes the location of such a guide tube (similar to the tube 8 of FIGS. 1 and 3). This guide tube has, at its end, a plug (not shown) with an internally threaded hole. A hollow screw 28 is screwed into the plug. The screw 28 has a collar 29 which is deformed as a result of expansion in recesses of the adaptor plate of the end nozzle. This ensures that the screw 28 for fastening the guide tube is locked against rotation.

The screw 28, accessible via an aperture in the filter plate 30, contributes to holding and fastening the plate 30 under the adaptor plate of the end nozzle.

Figure 7:
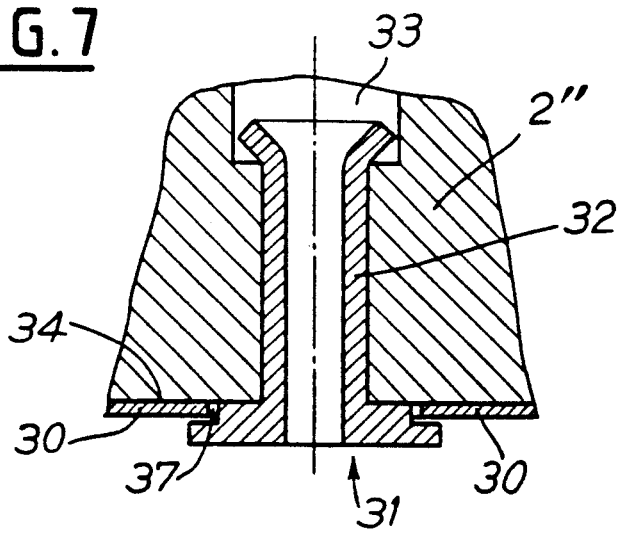
FIG. 7 is a sectional view showing a means for attaching a filter plate, as shown in FIG. 5.

The locations 31 situated vertically in line with the guide tubes similar to the tubes 8' of FIGS. 1 and 3 not connected to the lower end nozzle of the assembly, serve for the fastening of the filter plate 30, as can be seen in FIG. 7.

At each of the locations 31, the adaptor plate 2" is pierced with an aperture 33 in the lower part of which is engaged and locked by deformation a rivet 32 ensuring that the filter plate 30 is held against the bottom face 34 of the adaptor plate 2". The lower end of the guide tubes 8' comprising a plug is freely engaged in the upper part of the aperture 33. The rivet 32 is fixed in an extension having a reduced diameter of the upper part of the aperture in which the plug of the guide tube is received.

Figure 6:
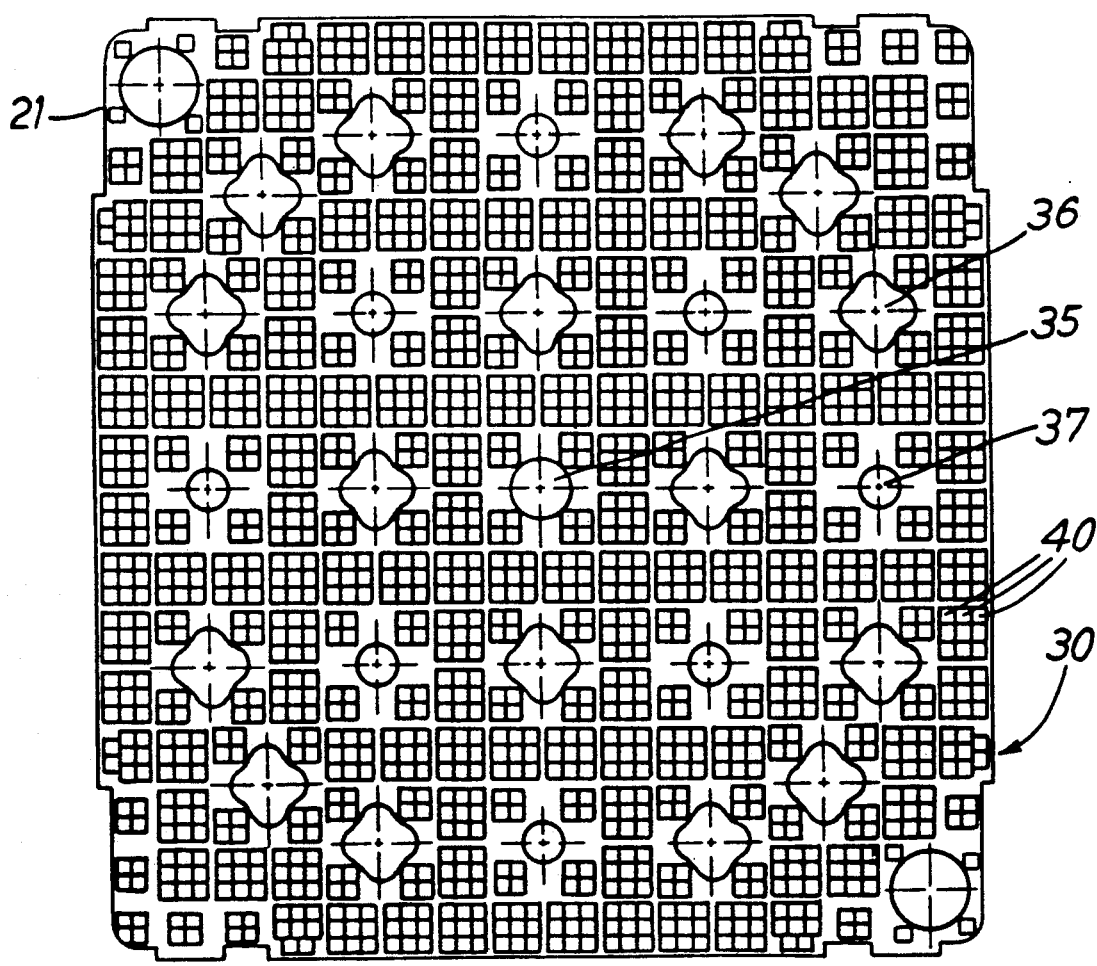
FIG. 6 is a top plan view of a filter plate equipping an adaptor plate, as shown in FIG. 5.

FIG. 6 illustrates a filter plate 30 which can be fastened in the way just described under the adaptor plate of the lower end nozzle of an assembly which has a set of guide tubes connected to the lower end nozzle and ensuring the rigidity of the framework of the assembly, and a set of guide tubes not connected to the lower end nozzle and serving solely for guiding absorbent rods.

The filter plate 30 has passing through it a central aperture 35 for the passage of the instrumentation tube of the assembly, sixteen clover-shaped apertures 36 for the passage of the guide tubes connected to the lower end nozzle, and eight circular apertures 37 allowing the passage of the rivets 32 for attaching the filter plate 30 to the adaptor plate of the end nozzle.

Furthermore, the plate 30 has passing through it small, square apertures 40 which are disposed in square array, in positions corresponding to the positions of the water-passage apertures 41 passing through the adaptor plate (FIG. 5).

The square apertures 40 are of such a dimension that the filter plate 30 can retain the particles liable to be jammed between the fuel rods and the cells of the first grid of the assembly.

This arrangement of the apertures in square array can be especially advantageous for some arrangements of the apertures of the adaptor plate, for example when these apertures are disposed in square array.

The plate 30 is fastened against the adaptor plate both by means of the rivets and guide tubes passing through the apertures 36 and 37 and by means of the feet of the assembly which have recesses, in which cutouts 21 of the filter plate 30 are engaged.

Figure 8:
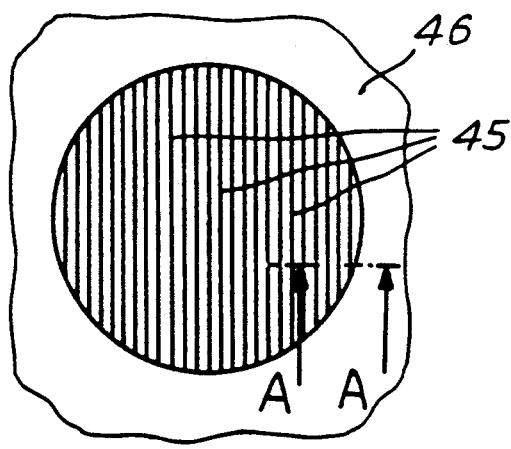
FIG. 8 is a partial top plan view of an embodiment of a filter plate according to the invention.
Figure 8A:
FIG. 8A is a sectional view along line A—A of FIG. 8.
Figure 9:
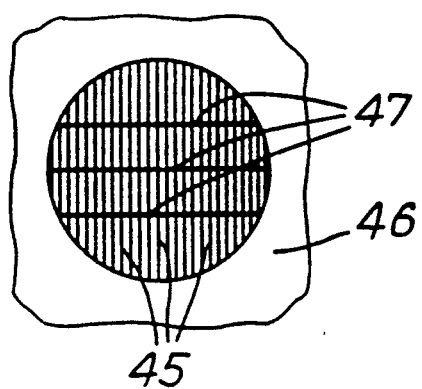
FIG. 9 is a partial top plan view of an alternative embodiment of the plate shown in FIG. 8.

FIGS. 8, 8A and 9 show part of a filter plate, the active zone of which is produced in the form of a grating comprising parallel lamellae 45, the spacing of which corresponds to the minimum size of the particles to be retained in the region of the filter plate 46.

The lamellae 45 are placed next to one another within circular apertures which are made in the plate 46 and the dimension of which corresponds to the dimension of the water-passage holes of the lower core plate. These lamellae 45 can be welded at their ends to the edges of the aperture of the filter plate.

To limit the head loss of the coolant flow during the passage through the filter plate, the lamellae 45 are profiled, as can be seen in FIG. 8A. This profiled form adapted to the flow of fluid in the direction perpendicular to the filter plate allows an appreciable reduction in head loss.

The lamellae 45 of the active parts of the filter plate 46 are fastened at their ends only and are all parallel to one another. They are liable to vibrate under the effect of the hydraulic stresses of the coolant flow passing through the active zones of the filter plate 46.

To prevent these vibrations, it is possible to place stiffeners 47 in directions perpendicular to those of the lamellae 45, as can be seen in FIG. 9. The stiffeners 47 can be welded or otherwise fastened to the lamellae and to the edges of the aperture passing through the filter plate 46.

At all events, the filter plate according to the invention ensures effective retention of those particles contained in the coolant flow of the reactor whose size exceeds a predetermined limit.

This filter plate introduces only a moderate head loss into the circuit of the coolant flow, inasmuch as the apertures of the filter plate are in the extension of the passage apertures of the lower core plate.

If these apertures are made by the stamping of a plate, the deflector elements of the plate are pointed in the direction of flow, thus making it possible to reduce the head loss.

According to one alternative embodiment, the parallel lamellae equip the entire cross-section of the filter plate 46.

In the production of lower end nozzles of fuel assemblies according to the invention, to produce the filter plate it is possible to use any material resistant to the coolant flowing in the reactor and to the mechanical stresses exerted as a result of the passage of the fluid.

Preferably, this adaptor plate can be produced from a nickel-based alloy with structural hardening, or from a martensitic steel.

At all events, during operation the filter plate is bonded against the adaptor plate and covers virtually the entire surface of this plate.

The advantage of the lower end nozzle according to the invention is that it makes it possible to ensure effective filtration of the coolant flow of the reactor, in such a way that particles transported by this fluid whose size exceeds a particular limit are retained under the lower end nozzle. The particle retainer used, consisting of a filter plate bonded under the adaptor plate of the lower end nozzle, does not increase the head loss of the coolant flow passing through the lower end nozzle to any appreciable extent, and the filter plate is held perfectly against the adaptor plate, with the result that it is capable of withstanding the forces generated by the circulating coolant fluid, without being of large thickness, even when it has solid parts of only small thickness separating the filter holes passing through it.

The general overall size of the lower end nozzle is not increased, and this end nozzle can remain dismountable, inasmuch as there are in the filter plate apertures for access to the end for the fastening of the guide tubes to the adaptor plate.

The invention is not limited to the embodiments described.

Thus, it is possible to fastening the filter plate under the adaptor plate than those described.

For example, the mounting of the edge of the filter plate in a groove delimited by a shoulder, described in respect of a filter plate in two parts, can be used in a general way for a filter plate produced in any form.

As regards an assembly having two sets of guide tubes, one of which ensures the rigidity of the framework and the other of which serves only for guiding the absorbent rods, the filter plate may be fastened by means other than rivets engaged in apertures of the adaptor plate vertically in line with the tubes serving only for guidance, although this method of fastening is especially suitable.

I claim:

1. A lower end nozzle of a nuclear fuel assembly, comprising an adaptor plate (2, 2', 2'') having water passage holes and a bottom face, supporting feet (3, 12, 15) and a device for the retention of particles contained in the coolant flow of the reactor, in which the retention device (6, 11, 16, 30, 46) consists of a filter plate pierced with filtration holes having a smaller size than said water passage holes and being fastened against the bottom face of the adaptor plate over a substantial part of its surface.

2. The lower end nozzle as claimed in claim 1, in which the filter plate (6, 11, 16, 30, 46) is attached to the adaptor plate (2, 2', 2'') by welding.

3. The lower end nozzle as claimed in claim 1, in which the filter plate (6, 11, 16, 30, 46) is attached to the adaptor plate (2, 2', 2'') by brazing.

4. The lower end nozzle as claimed in claim 1, in which the filter plate (6, 11, 16, 30, 46) is attached to the adaptor plate (2, 2', 2'') by riveting.

5. The lower end nozzle as claimed in claim 1, in which the filter plate (6, 11, 16, 30, 46) is attached to the adaptor plate (2, 2', 2'') by means for attaching the guide tubes of the assembly to lower end nozzle.

6. The lower end nozzle as claimed in claim 1, in which the holes of the filter plate (6, 11, 16, 30, 46) are made by cutting out from the plate.

7. The lower end nozzle as claimed in any one of claims 1 to 5, in which the holes of the filter plate (6, 11, 16, 30, 46) are made by stamping.

8. The lower end nozzle as claimed in claim 1, in which the filter plate (6, 11, 16, 30, 46) has apertures (36) opposite zones of connection of guide tubes of the assembly to the adaptor plate (2, 2', 2'') of the lower end nozzle (1).

9. The lower end nozzle as claimed in claim 1, in which the filter plate (30) has apertures of square form (40).

10. The end nozzle as claimed in claim 1, in which the lower filter plate (46) has apertures delimited by parallel lamellae (45).

11. The lower end nozzle as claimed in claim 1, in which the filter plate (6, 11, 16, 30, 46) has a recessed central part (35) coming in contact with a central part of the adaptor plate (2, 2', 2''), and in which the adaptor plate (2, 2', 2'') has, in this zone, holes of a dimension smaller than the size of the particles to be retained, instead of water passages of larger dimension passing through the adaptor plate (2, 2', 2'') in its other parts.

12. The lower end nozzle as claimed in claim 1, in which the filter plate (11) consists of a thin plate of elastic material capable of being introduced in a deformed state between the feet (12) of the lower end nozzle (10) and then placed flat against the bottom face of the adaptor plate.

13. The lower end nozzle as claimed in claim 1, in which the filter plate (16) comprises at least two parts (16a, 16b) which are introduced separately between the feet (15) of the lower end nozzle and which are placed in abutment with one another along a connecting edge (17).

14. The lower end nozzle as claimed in claim 1, in which the filter plate (6, 11, 16, 30, 46) is produced from a nickel alloy with structural hardening.

15. The lower end nozzle as claimed in claim 1, in which the filter plate (6, 11, 16, 30, 46) is produced from a martensitic steel.

16. A nuclear fuel assembly having a lower filtering end nozzle as claimed in any one of claims 1 to 6.

17. a nuclear fuel assembly having guide tubes (8) with lower ends attached to a lower end nozzle (1) having openings therethrough (41) for a coolant flow and a debris filter, said filter comprising a plate (6, 11, 16, 30, 46) attached to the bottom of the adaptor plate (2, 2', 2''), said adaptor plate comprising coolant flow apertures disposed in a square array.

18. A fuel assembly comprising a lower end nozzle (1), a first set of guide tubes (8) attached to the lower end nozzle (1) and ensuring structural rigidity of the fuel assembly, a plurality of spacer grids (9) and a second set of guide tubes (8') not attached to the lower end nozzle (1), said fuel assembly having a lower filtering end nozzle as claimed in any one of claims 1 to 6.

19. The fuel assembly according to claim 18, in which the adaptor plate (2'') of the lower end nozzle (1) has passing through it an aperture (18-23) aligned with each of the guide tubes (8') of the second set, in which fuel assembly the filter plate (30) id attached to the adaptor plate (2'') by means of rivets (32), each engaged in an aperture (18-33) of the adaptor plate (24) and in a corresponding aperture (37) of the filter plate.

* * * * *